Nov. 6, 1962  B. JACKS  3,063,037
MAGNETOSTRICTIVE WIRED STORAGE
Original Filed Aug. 26, 1957

INVENTOR.
BASIL JACKS
BY Raymond A. Paquin
ATTORNEY.

United States Patent Office 3,063,037
Patented Nov. 6, 1962

3,063,037
MAGNETOSTRICTIVE WIRED STORAGE
Basil Jacks, East Meadow, N.Y., assignor to American Bosch Arma Corporation, a corporation of New York
Continuation of application Ser. No. 680,079, Aug. 26, 1957. This application Nov. 4, 1959, Ser. No. 850,879
6 Claims. (Cl. 340—173)

The present invention relates to storage devices for digital computers and has particular reference to magnetostrictive storage.

This application is a continuation of my application Serial Number 680,079, filed August 26, 1957, now abandoned.

A constant magnetic field is provided for each coil by a small permanent magnet adjacent thereto, or by some other convenient means.

The present invention is a magnetostrictive storage wherein a number of words of digital information may be stored using only one set of output coils and a magnetostrictive wire, such as nickel, and input coil for each word to be stored. In a preferred embodiment, the magnetostrictive wire is threaded through each pickoff coil from which a pulse is desired, and around each coil from which no output is desired.

When the information stored by a particular magnetostrictive wire is required, the input coil for that wire is energized with a pulse, and the desired information appears at the terminals of the series connected pickoff coils as a series of pulses representing a digital number in serial form.

In an alternative arrangement, the magnetostrictive wires do not actually pass through the pickoff coils, but are situated close enough to the coil to create a change in the reluctance of the magnetic circuit through the coil whenever the wire is stressed.

Figure 1:
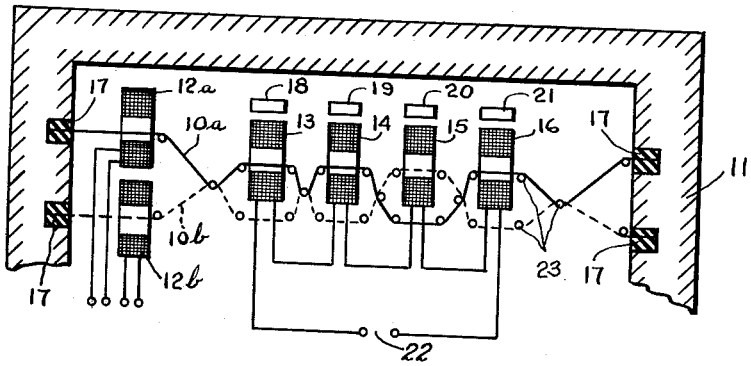
Figure 2:
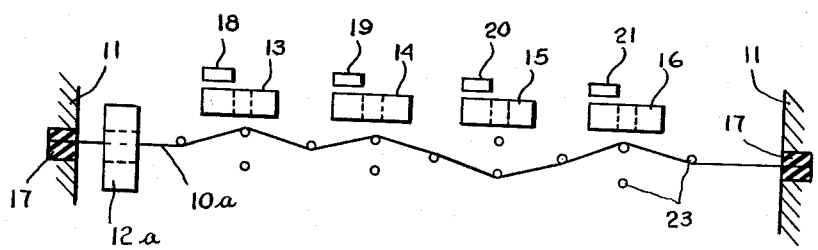

For a more complete understanding of the invention, reference may be had to the accompanying diagrams, in which, FIG. 1 shows the magnetostrictive storage according to the present invention; and FIG. 2 is a modification of FIG. 1.

Referring to FIG. 1 of the drawings, a number stored by the apparatus shown is to be made available in binarial form upon energization of coil 12a at the terminal 22 with which the output coils 13, 14, 15, 16 are connected in series. For example, if the number eleven which corresponds to 1011 in binarial form is to be stored, a wire 10a of magnetostrictive material, such as nickel, spans the open area of a frame 11 and is threaded through each of the coils 12, 13, 14, 16 and around coil 15. The coil 12a is the input coil which is energized by a pulse at a given instant to produce a temporary magnetic field in the coil 12a and, thereby, to cause creation of a compression or stress in the wire 10a at the position of coil 12a. This stress spreads out from coil 12a in both directions as a compression wave, one wave being absorbed by the acoustic damping material 17 at one end of the wire 10, and the other compression wave passing successively through each of the pickoff coils 13, 14, around coil 15, through coil 16 and finally being absorbed by the damping material 17 at the other end of the wire. The damping material 17, which may be rubber for example, prevents reflection of the wave from the ends of the wire 10a.

A separate bar magnet 18, 19, 20, 21 is placed adjacent each of the respective output coils 13, 14, 15 and 16. As the compression wave in wire 10 passes through the coil 13, the permeability of the magnetic circuit through the coil 13 changes whence the magnetic lines of flux from magnet 18 linking coil 13 change accordingly. The variation of the magnetic flux through the coil 13 causes a positive pulse to appear at the terminals of the coil 13. The term "positive pulse" includes a momentry voltage having a single positive peak which may or may not be preceded and followed by lesser negative peaks. The term "positive" is chosen for illustration, and in practice the pulse may be either positive or negative with respect to a reference point on the circuit. Similarly, as the compression wave passes through each of the coils 14 and 16 a positive pulse appears at the terminals of that coil. As the wave passes by coil 15, however, the effect in the permeability of the coil 15 is small compared to the effect on the others so that practically no pulse is obtained across coil 15.

Therefore, if the lowest order digit is represented by the output of coil 13, there appears a train of pulses at terminals 22 which is representative of the binarial number 1011.

It will be seen that the wires 10a and 10b are threaded through their own input coils 12a and 12b respectively and through each of those output coils 13, 14, 15, 16 from which a positive pulse is desired and around each of those coils 13, 14, 15, 16 from which a positive pulse is not desired.

The wire 10a is guided around the various pegs 23 so as to keep the same length of wire 10a between the planes of successive coils 13, 14, 15, 16 in order to maintain the time interval between the pulses in the output signal at terminals 22 at the constant desired amount.

A second magnetostrictive wire 10b is shown threaded through its input winding 12b around each of the coils 13, 14 through coil 15 and around coil 16. Upon momentary energization of coil 12b, a serial representation of the binary number 0100 is made available at terminals 22. Thus, for any desired output at terminals 22, the magnetostrictive wire is threaded through and around the appropriate coils. As many additional numbers as desired may be stored simply by adding an input coil and a magnetostrictive wire for each number.

FIG. 2 shows an alternative embodiment wherein a magnetostrictive strip 10a is merely positioned adjacent to the output coils rather than being threaded therethrough. The coils 13, 14, 15 and 16 lie in a horizontal plane, with the biasing magnets 18, 19, 20, 21 positioned above the respective coils and the magnetostrictive strip 10a positioned below the coils. The strip 10a is guided around the pegs 23, so as to be close to those coils 13, 14 and 16 from which a pulse is desired and at a distance from those coils 15 from which a pulse is not desired. The coils 13, 14, 15 and 16 are connected in series with the terminals 22 to produce at terminals 22 a serial binary representation of the number eleven, as in the prior examples.

In this embodiment, the voltages induced in each of the coils 13, 14, 15, 16 are all in the same direction, for example positive, but of two distinct levels. The voltage induced in windings 13, 14 and 16 is much greater than that induced in winding 15. The output device connected to the terminals 22, therefore, must be capable of distinguishing between two levels of positive pulses. Although FIG. 1 shows the strip 10 as being located in a plane substantially perpendicular to the plane of the coils, the strip 10a may be guided in a plane parallel to the plane of the coils if so desired. The schema of FIG. 2 allows for ease of construction since the magnetostrictive wire need not be threaded through the coils.

Referring again to FIG. 1, it will be seen that the pulses to the input coils 12a, 12b, and others not shown, must be separated in time by an amount sufficient to allow the compression wave in the first magnetostrictive wire to pass by the last coil 16 before the compression wave on the next wire enters the first coil 13. In operation, the numbers stored by the wires 10a, 10b etc., not shown, can be extracted only one at a time, but in any desired sequence.

Many modifications of the particular embodiments disclosed will occur to those active in the art. For example, it will be seen that the output coils 13, 14, 15, 16 can be connected in parallel with terminals 22 instead of in series with the terminals 22. Also, a magnet may be place opposite the input coils as well as the output coils for improved operation. It is contemplated, too, that the magnetostrictive element may be a ribbon, strip or any other form of a long thin element, broadly formed a magnetostrictive wire in the disclosure.

I claim:

1. In a device of the character described, a support, an input coil in fixed relation with said support, a plurality of output coils in fixed relation with said support and said input coil, a magnet adjacent each output coil, a magnetostrictive member threaded through said input coil and certain of said output coils and around others of said output coils and connected adjacent its opposite ends to said support, and electric connections between said output coils for connecting said coils whereby an electrical signal is induced only in those coils through which the member is threaded.

2. In a device of the character described, a support, a plurality of input coils in fixed relation with said support, a plurality of output coils in fixed relation with said support and said input coils, a magnet adjacent each output coil for providing a magnetic flux through each output coil, a magnetostrictive member threaded through each of said input coils and said members being threaded through certain of said output coils and around others of said output coils and connected adjacent their opposite ends to said support and electric connections between said output coils for connecting said coils.

3. In a device of the character described, a support, a plurality of input coils in fixed relation with said support, a plurality of output coils in fixed relation with said support and said input coils, a magnet adjacent each output coil for providing a magnetic flux through each output coil, a separate magnetostrictive member threaded through each of said input coils and said members being threaded through certain of said output coils and around others of said output coils and connected adjacent their opposite ends to said support and electric connections between said output coils for connecting said coils.

4. In a device of the character described, a support, an input coil in fixed relation with said support, a plurality of output coils in fixed relation with said support and said input coil, a magnet adjacent each output coil, a magnetostrictive member threaded through said input coil and certain of said output coils and around others of said output coils and connected adjacent its opposite ends to said support and electric connections between said output coils for connecting said coils, the length of said magnetostrictive member between successive output coils being substantially equal.

5. In a device of the character described, a support, a plurality of input coils in fixed relation with said support, a plurality of output coils in fixed relation with said support and said input coils, a magnet adjacent each output coil for providing a magnetic flux through each output coil, a magnetostrictive member threaded through each of said input coils and said members being threaded through certain of said output coils and around others of said output coils and connected adjacent their opposite ends to said support and electric connections between said output coils for connecting said coils, the length of said magnetostrictive member between successive output coils being substantially equal.

6. In a device of the character described, a support, a plurality of input coils in fixed relation with said support, a plurality of output coils in fixed relation with said support and said input coils, a magnet adjacent each output coil for providing a magnetic flux through each output coil, a magnetostrictive member threaded through each of said input coils and said members being in varying relation with certain of said output coils for inducing voltages in certain of said coils.

References Cited in the file of this patent

UNITED STATES PATENTS

| | | |
|---|---|---|
| 2,832,897 | Buck | Apr. 29, 1958 |
| 2,914,757 | Millership et al. | Nov. 24, 1959 |